(12) United States Patent
Morliere et al.

(10) Patent No.: US 11,555,405 B2
(45) Date of Patent: Jan. 17, 2023

(54) DEVICE FOR HOLDING A COOLING TUBE FOR A TURBOMACHINE CASING

(71) Applicant: SAFRAN AIRCRAFT ENGINES, Paris (FR)

(72) Inventors: Simon Nicolas Morliere, Moissy-Cramayel (FR); Nicolas Jean-Marc Marcel Beauquin, Moissy-Cramayel (FR); Stéphane Pierre Guillaume Blanchard, Moissy-Cramayel (FR); Gaëlle Inès Méganne Moreaux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 545 days.

(21) Appl. No.: 16/704,031

(22) Filed: Dec. 5, 2019

(65) Prior Publication Data

US 2020/0182058 A1    Jun. 11, 2020

(30) Foreign Application Priority Data

Dec. 6, 2018   (FR) ..................................... 1872452

(51) Int. Cl.
*F01D 3/02*   (2006.01)
*F01D 5/08*   (2006.01)
(Continued)

(52) U.S. Cl.
CPC ................. *F01D 3/02* (2013.01); *F01D 5/08* (2013.01); *F01D 9/065* (2013.01); *F01D 11/24* (2013.01);
(Continued)

(58) Field of Classification Search
CPC .......... F01D 11/24; F01D 25/24; F01D 25/28; F02C 7/00; F16L 3/02; F05D 2260/30; F05D 2260/38; F05D 2230/237
See application file for complete search history.

(56) References Cited

U.S. PATENT DOCUMENTS 5,271,588 A   12/1993  Doyle
6,896,038 B2   5/2005  Arilla et al.
(Continued)

FOREIGN PATENT DOCUMENTS

FR   2 995 022 A1    3/2014
FR   3002590 A1 *   8/2014  .............. F01D 11/24
(Continued)

OTHER PUBLICATIONS

Preliminary Search Report dated Sep. 23, 2019, issued by the French Republic National Institute of Industrial Property in application No. FR 1872452.

*Primary Examiner* — Courtney D Heinle
*Assistant Examiner* — Ryan C Clark
(74) *Attorney, Agent, or Firm* — Sughrue Mion, PLLC

(57) ABSTRACT

A device for holding (101) at least one cooling tube (120) of a turbomachine casing (10) cooling system (100), the holding device including a fixing frame (104), a holding member (160) being configured to hold two cooling tubes (120), and a connection assembly (140) between the holding member (160) and a fixing frame (104), extending on either side of the frame, the connection assembly (160) comprising a connection part (150) extending through an opening (108) of the fixing frame from an outer portion (141) to the inner portion (142) of the connection assembly, the inner portion (142) being disposed between two cooling tubes (120) and secured to the holding member (160) while the outer portion (141) comprises a resilient return member (170) urged in
(Continued)

compression towards the fixing frame by the connection part (150).

12 Claims, 3 Drawing Sheets

(51) Int. Cl.
*F01D 9/06* (2006.01)
*F01D 11/24* (2006.01)
*F01D 25/28* (2006.01)
*F02C 7/00* (2006.01)
*F16L 3/02* (2006.01)

(52) U.S. Cl.
CPC ............... *F01D 25/28* (2013.01); *F02C 7/00* (2013.01); *F16L 3/02* (2013.01); *F05D 2260/38* (2013.01)

(56) References Cited

U.S. PATENT DOCUMENTS

| | | | |
|---|---|---|---|
| 10,295,087 B2* | 5/2019 | Chouinard | F16L 3/237 |
| 11,098,613 B2* | 8/2021 | Durand | F01D 25/12 |
| 11,293,303 B2* | 4/2022 | Prestel | F01D 11/24 |
| 2014/0030066 A1 | 1/2014 | Schimmels et al. | |
| 2015/0345328 A1* | 12/2015 | Prestel | F02C 7/18 |
| | | | 415/116 |
| 2018/0216488 A1* | 8/2018 | Bun | F01D 25/12 |
| 2019/0226357 A1* | 7/2019 | Beauquin | F01D 25/14 |
| 2021/0164361 A1* | 6/2021 | Morliere | F02C 7/32 |
| 2021/0164362 A1* | 6/2021 | Morliere | F01D 11/24 |

FOREIGN PATENT DOCUMENTS

| | | |
|---|---|---|
| FR | 3 021 700 A1 | 12/2015 |
| FR | 3 040 429 A1 | 3/2017 |

* cited by examiner

DEVICE FOR HOLDING A COOLING TUBE FOR A TURBOMACHINE CASING

TECHNICAL FIELD

The present invention relates to the field of turbomachines, in particular for aircraft, and relates more particularly to a device for holding at least one cooling tube of a turbomachine casing cooling system.

STATE OF THE ART

In order to ensure the cooling of some casings, and in particular of low pressure turbine casing, there is provided a cooling device that comprises a set of cooling tubes, also called cooling ramps, pierced with holes and disposed outside the casing, most often by surrounding said casing, so that air, sucked upstream of the turbomachine with respect to the flow direction of the gases in the turbomachine, is sent to the outer face of the casing. The cooling system may further comprise several boxes disposed around the casing to supply the cooling tubes with air.

There are known LPTCC (Low Pressure Turbine Clearance Control) type cooling systems. The LPTCC system may be controlled by the FADEC (Full Authority Digital Engine Control); this is then called active control, and the system being then designated by the acronym LPTACC. When it is not controlled by the FADEC, this is called passive control for the LPTCC system. Its main function is to regulate the rotor/stator clearance between the parts of the low pressure turbine by modulating the air flow rate taken from the secondary stream for the cooling of the low pressure turbine casing.

The cooling tubes of the LPTCC or LPTACC systems are for example held in position around the casing by the supply boxes and by fixing frames, secured to the casing. The fixing frames may be fixing sheets, generally radially flat sheets in which fixing collars, also called shower collars, are fixed. The fixing collars surround the cooling tubes and ensure their positioning around the casing.

For this purpose, FIG. 1 shows a perspective view of a cooling system 1 for a low pressure turbine casing of a turbomachine according to the state of the art. FIGS. 1 and 2 show a turbomachine casing 2, a cooling system 1 for the cooling of the casing 2 including a plurality of cooling tubes 3, a supply box 4 supplying the plurality of cooling tubes with air, a plurality of fixing frames 5 for holding in position the cooling tubes 3 around the casing 2.

FIG. 2 shows a partial sectional view of the cooling system 1 for a turbomachine casing according to the state of the art. FIG. 2 shows more particularly a fixing frame under which a plurality of collars 6 are fixed, each collar 6 surrounding a cooling tube 3. A certain clearance (in the radial direction of the turbine) is arranged between the fixing collars or the cooling tubes and the outer shell of the casing in particular to prevent any contact of the parts (fixing collars, cooling tubes, casing) that could cause damage.

However, the clearance between the cooling tubes and the outer shell of the casing must be as small as possible to position the cooling tubes as close as possible to the shell of the casing and thus promote cooling thereof.

In practice, the technological and technical constraints, such as in particular the tolerances of the parts, the vibratory phenomena in operation, the expansions of the parts in operation, require moving away the cooling tubes in order to avoid any contact between the fixing collars (or the cooling tubes) which could damage the parts in contact, and in particular the outer shell of the casing.

The current technical difficulty is to find a good compromise of radial positioning of the cooling tubes making it possible to avoid the contact of the parts while making the cooling system as effective as possible through an air gap as small as possible between the cooling tubes and the casing. Indeed, a minimal clearance is difficult to guarantee and master because the casing and the cooling tubes are large-diameter parts and the various intermediate parts involved in holding the tubes cause a stack-up of the tolerances that consequently increases the minimum allowable clearance.

Various solutions to better meet certain constraints have been in particular presented. The French patent application published under the number FR3021700 A1 describes for example a solution to better master the positioning of the cooling tube by reducing the number of intermediate parts for the holding of the cooling tubes. Radially extending spacers are arranged between two platens, the cooling tubes being disposed between the spacers. Such a solution allows in particular minimizing the stack-up of the tolerances related to each intermediate part and therefore better mastering the positioning of the cooling tubes.

However, in some situations and in some turbomachine configurations, the known solutions are not completely satisfactory and the cooling efficiency constraints require reducing the clearances. In these situations, contacts between the fixing collars and the casing shell may appear.

Another solution consists in providing an adjustment means configured to allow adjusting the relative position of a member for holding a cooling tube with respect to the fixing frame. However, such a solution requires a fine, long and tedious adjustment during the mounting of each holding member.

PRESENTATION OF THE INVENTION

The present invention aims at overcoming the drawbacks of the state of the art by proposing a holding device that is easy to mount, that does not require adjustment, and that allows maintaining an air gap that is minimal while avoiding contacts between the cooling tubes and the turbomachine casing, despite the possible expansions of the members of the turbomachine that may occur in operation.

For this purpose, the invention relates to a device for holding at least one cooling tube of a turbomachine casing cooling system, the casing extending about an axial direction of the turbomachine, the holding device including a fixing frame adapted to be secured to the casing in a radially outer manner with respect to the casing, a holding member configured to hold the cooling tube, and a connection assembly disposed between the holding member and the fixing frame, remarkable in that the connection assembly extends on either side of the fixing frame, defining with respect to the fixing frame an outer portion of the connection assembly radially external to the fixing frame and an inner portion of the connection assembly radially internal to the fixing frame, on the casing side, the connection assembly comprising a connection part extending through an opening of the fixing frame from the outer portion to the inner portion, the inner portion radially internal to the fixing frame being secured to the holding member while the outer portion comprises a resilient return member urged in compression towards the fixing frame by the connection part, wherein the holding member is configured to hold two axially adjacent cooling tubes, and the inner portion of the connection assembly is disposed between two axially adjacent cooling tubes.

The device is advantageously completed by the following characteristics, taken alone or in any one of their technically possible combination:

- the opening of the fixing frame has a section greater than the section of the portion of the connection assembly passing through this opening, so as to authorize a displacement between the connection assembly and the frame, the opening of the fixing frame having an oblong shape, the opening of the fixing frame having in the circumferential direction a dimension at least 1.5 times greater than its dimension in the axial direction;
- the device comprises a bushing extending in the outer portion of the connection assembly, the bushing forming an abutment in the radially inner direction for the connection part, and forming an abutment in the radially outer direction for the resilient return member, wherein the connection part has at its radially outer end a head defined by an enlarged section, and the bushing has a shoulder forming an abutment in the radially inner direction for the head of the connection part, and wherein the bushing has a flange and the resilient return member is disposed between this flange and the fixing frame;
- the connection part is a bolt comprising a threaded body, and the inner portion comprises a threaded accommodation member disposed on the side radially internal to the holding member, and wherein the threaded body of the bolt is screwed;
- the device comprises an outer bearing member in the outer portion of the connection assembly, disposed against the outer face of the fixing frame, on which bears the resilient return member;
- the device comprises an inner bearing member in the inner portion of the connection assembly, disposed against the inner face of the fixing frame and separating the holding member and said inner face of the fixing frame;
- the holding member is partially covering the periphery of the cooling tubes and extends around part of the circumference of a cooling tube in a half-ring shape;
- the holding member extends around part of the circumference of a cooling tube and leaves free another part of the circumference of the cooling tube intended to face the casing;
- the holding member has a generally flat central portion and two half-ring shaped portions intended to conform to and cover, at least partially, the annular shape of the two adjacent cooling tubes;
- a hole of the holding member traversed by the connection part is arranged in the central portion that joins the two half-ring shaped portions.

The invention also relates to a turbomachine casing cooling system, including:

- at least one cooling tube,
- a holding device according to the invention, the holding member of the holding device holding two axially adjacent cooling tubes.

The invention also relates to a turbomachine for an aircraft comprising a casing extending about an axial direction of the turbomachine, and a cooling system according to the invention, the cooling system comprising a holding device including a fixing frame secured to the casing in a radially outer manner with respect to the casing, at least one cooling tube being disposed in a radially outer manner with respect to the casing between the casing and the fixing frame of the holding device.

BRIEF DESCRIPTION OF THE DRAWINGS

The invention will be better understood, thanks to the following description which refers to a preferred exemplary embodiment, given by way of non-limiting example and explained with reference to the appended schematic drawings, wherein.

DETAILED DESCRIPTION

Figure 3:
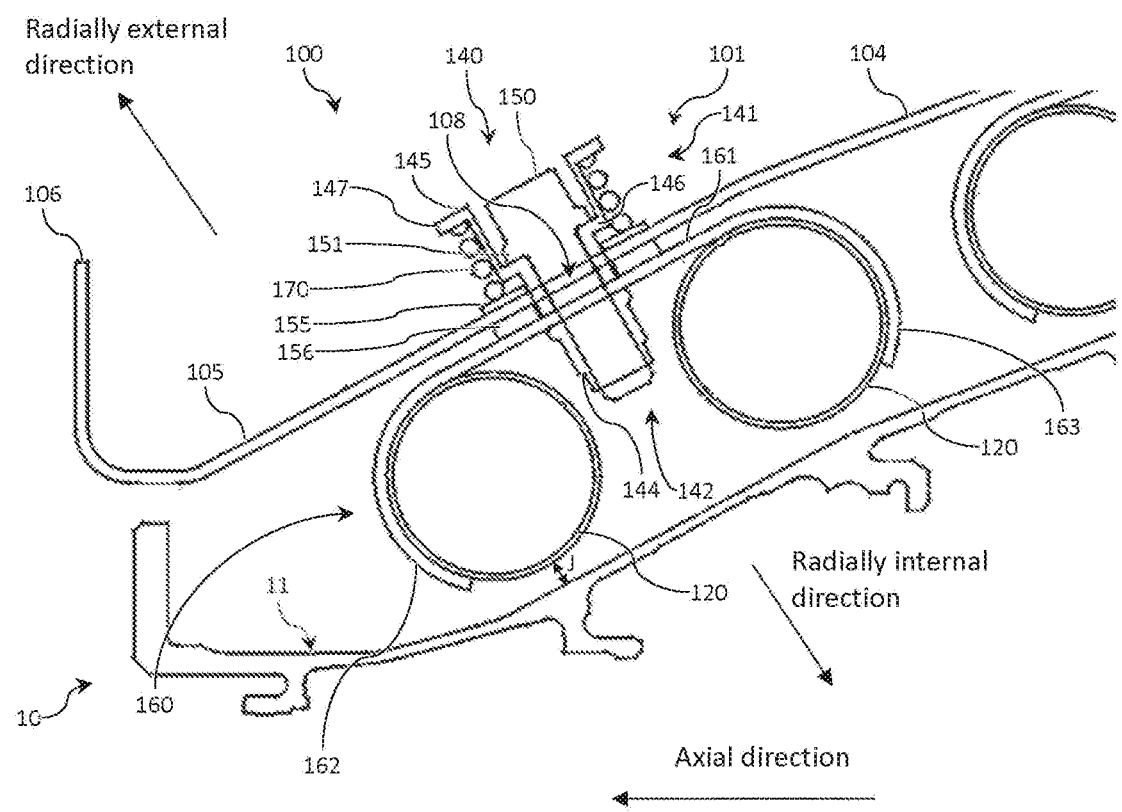
FIG. 3 illustrates a partial sectional view of one example of a cooling system for a turbomachine casing according to one possible embodiment of the invention.
Figure 4:
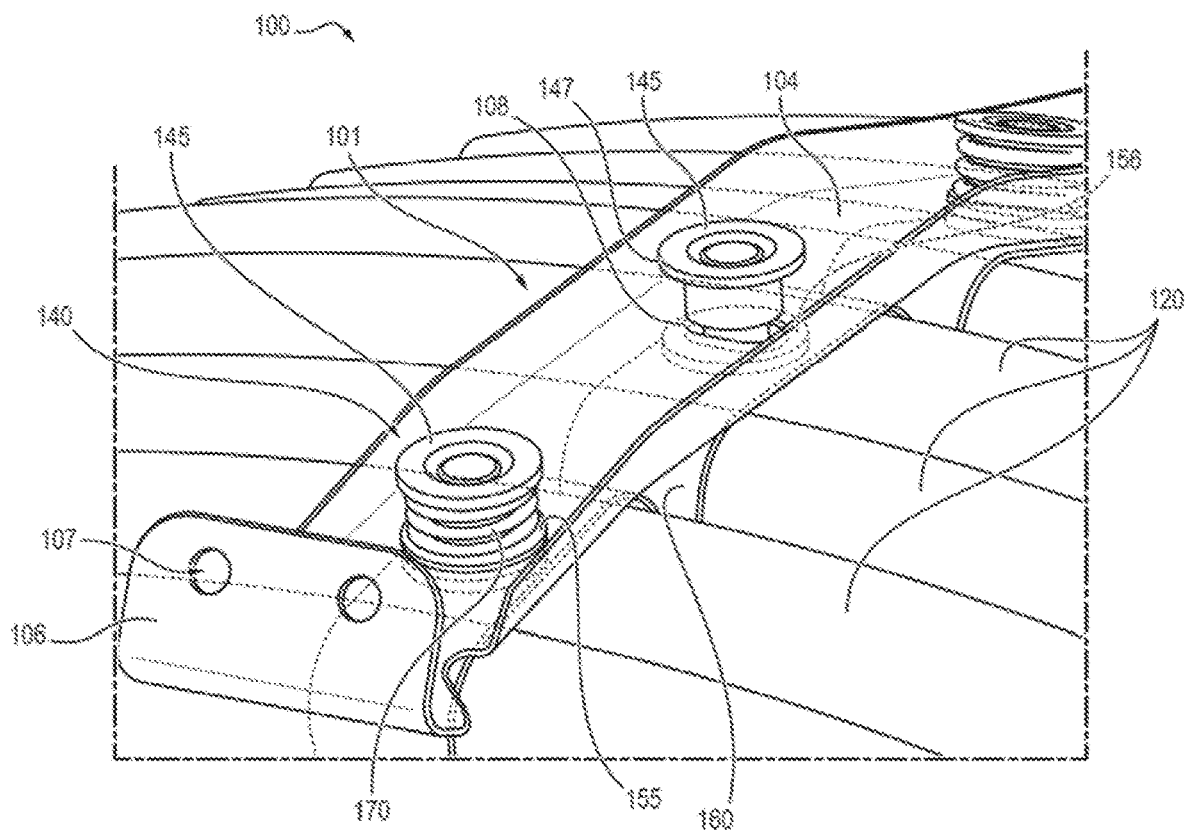
FIG. 4 illustrates a perspective view of one example of a cooling system for a turbomachine casing according to one possible embodiment of the invention.

FIGS. 3 and 4 illustrate a non-limiting example of a cooling system 100 for a turbomachine casing 10 according to one possible embodiment of the invention. Typically, and as in this example, the cooling system 100 is mounted around the casing 10 of a low pressure turbine.

The cooling system 100 comprises a plurality of cooling tubes 120 mounted around the casing 10. The casing 10 extends around an axial direction of the turbomachine, and the cooling tubes 120 extend transversely to this axial direction, and are distributed along the circumference of the casing 10. The cooling system 100 also comprises devices for holding 101 the cooling tubes 120 for the positioning and the holding of the cooling tubes 120 around the casing 10.

Figure 1:
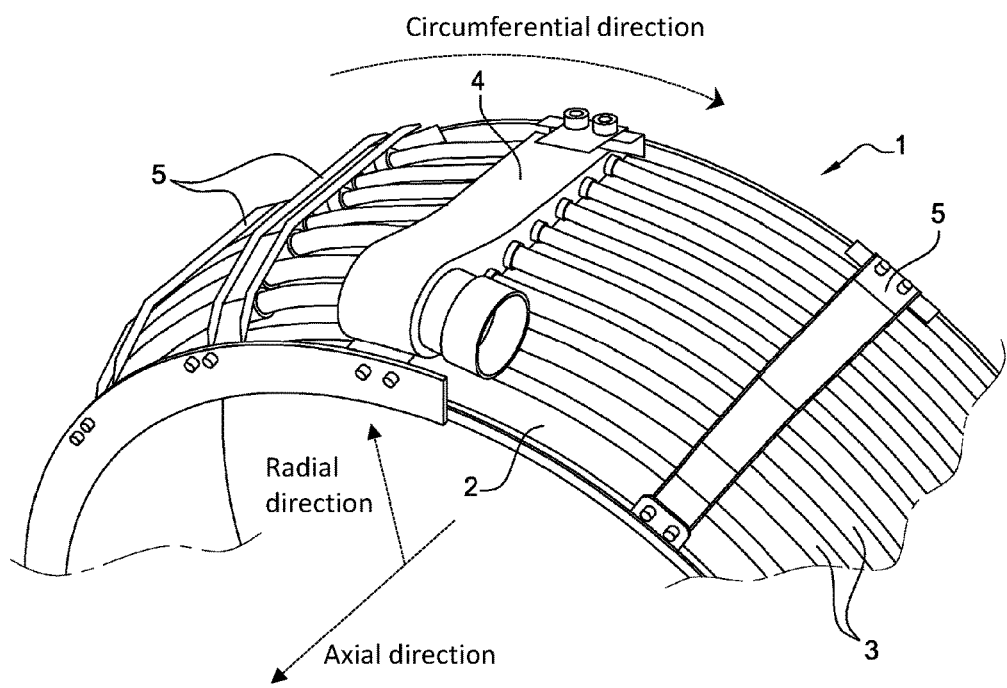
FIG. 1, already discussed, illustrates a perspective view of a cooling system for a low pressure turbine casing of a turbomachine according to the state of the art, FIG. 2, already discussed, illustrates a sectional view of one example of a cooling system for a turbomachine casing of the state of the art.
Figure 2:
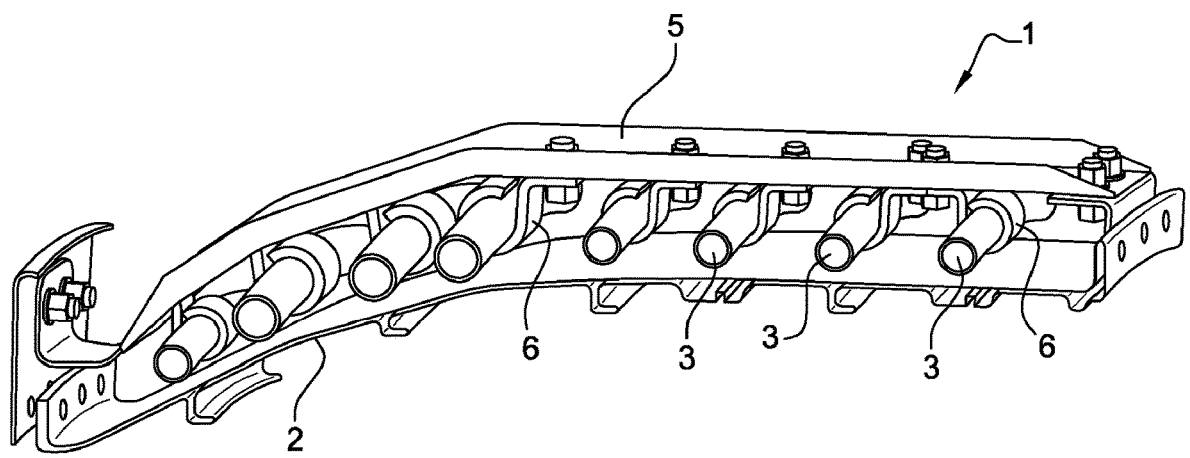

The cooling system 100 in the example represented is a LPTACC cooling device. With typically supply boxes, not represented in FIGS. 3 and 4 but similar to the supply box 4 of FIG. 1, the cooling tubes 120 and the holding device 101 constitute the cooling system 100 for the low pressure turbine casing 10. Such a system can also apply to a cooling device LPTC, or to any other turbomachine casing cooling system.

Conventionally, the two cooling tubes 120 have orifices not visible in FIGS. 3 and 4. In operation, the supply boxes supply with relatively cool air with respect to the casing 10, the cooling tubes 120, which send towards the external face 11 of the casing 10 the air thus available through the orifices (not visible in the figure). Typically, the supply boxes are distributed along the circumference of the cooling device. Thus, each area of the cooling tubes 120 is supplied with air by a close supply box, which makes it possible to have a sufficient air flow rate sent via the orifices of the cooling tubes 120 regardless of the considered area of the cooling tubes 120.

The holding device 101 comprises in particular a fixing frame 104, taking here the form of a fixing sheet, having a main portion 105, a first end 106, and a second end (not represented). The fixing frame 104 is secured to the casing 10 in a radially outer manner with respect to the casing 10. For this purpose, the ends 106 of the fixing frame 104 may have fixing means such as holes 107 accommodating bolts or rivets, in order to allow fixing the fixing frame 104 securely to the casing, possibly by means of intermediate structures. It is possible that the holes 107 have an oblong shape, with a larger dimension in one direction (typically in the axial direction), in order to allow free expansion of the casing 10 with respect to the fixing frame 104 in this direction.

The holding device 101 comprises several members for holding 160 the cooling tube 120. Each holding member 160 allows the attachment of at least one cooling tube 120. The holding member 160 is for example a holding bracket or a preformed holding plate.

Advantageously, the holding member 160 extends around part of the circumference of a cooling tube 120, typically in a half-ring shape, and leaves free another part of the circumference of the cooling tube 120 intended to face the turbomachine casing 10. The holding member 160 partially covers the periphery of the cooling tubes 120 and only a radially outer portion of the cooling tubes 120, in particular the periphery of the cooling tubes 120 facing the fixing frame 104. It is at this level that the holding member 160 is made secured to the cooling tube 120, for example by brazing.

The holding member may thus have a generally flat central portion 161 and two half-ring shaped portions 162, 163 intended to conform to and cover, at least partially, the annular shape of two adjacent cooling tubes 120. The cooling tubes 120 are secured to the holding member 160, for example by brazing. The holding member 160 advantageously allows securing the cooling tubes at a radially outer portion of the cooling tubes, that is to say on the fixing frame 104 side, in particular so as to avoid the presence of a part or of an additional member between the cooling tube 120 and the casing 10, and so as to bring the cooling tubes 120 closer to the casing 10 for optimizing the cooling thereof.

Advantageously, the holding member 160, as represented, allows securing two cooling tubes 120 by means of one and the same holding member 160. In this embodiment, two axially adjacent cooling tubes 120 are held and positioned by providing only an opening 108 in the fixing frame 104. Thus, for a given turbomachine with a given number of cooling tubes, the fixing frame 104 according to the invention will have less opening 108 and less attachment area than a fixing frame according to the state of the art. However, it is also envisaged to provide a holding member for individually securing a cooling tube so as to improve the accuracy of adjustment of the radial position of the cooling tubes 120 with respect to the casing 10.

The holding device 101 also comprises a connection assembly 140 between the holding member 101 and the fixing frame 104, whose function is to provide the mechanical connection between the holding member 101 and the fixing frame 104. Indeed, the holding member 101 must support at least one cooling tube 120 radially above the casing 10 leaving a clearance J between a cooling tube 120 and the outer surface 11 of the casing 10, and must therefore be supported by the fixing frame 104.

The connection assembly 140 extends on either side of the fixing frame 104, through the opening 108, which defines with respect to the fixing frame 104 an outer portion 141 of the connection assembly 140 radially external to the fixing frame 104, and an inner portion 142 of the connection assembly radially internal to the fixing frame 104, on the casing 10 side of the turbomachine.

The connection assembly 140 comprises a connection part 150 extending through the opening 108 of the fixing frame 104, from the outer portion 141 to the inner portion 142 of the connection assembly 140. The inner portion 142 is secured to the holding member 160. Particularly, the connection part 150 may be a bolt comprising a threaded body, and the inner portion 142 may comprise a threaded accommodation member 144 in which the threaded body of the bolt constituting the connection member 150 is screwed. The connection part 150 can pass through a hole of the holding member 160 and thus extend from one side radially internal to the holding member 160 that is to say towards the casing 10. The accommodation member 144 can be then disposed on the side radially internal to the holding member 160, so as to hold the holding member 160. The accommodation member 144 may typically be a nut screwed on one end of the bolt 150, bearing on the radially inner face of the holding member 160.

Preferably, the inner portion 142 of the connection part is disposed between two axially adjacent cooling tubes 120. Thus, one end of the connection part 150 extends on the side radially internal to the holding member 160 between the two axially adjacent cooling tubes 120 secured to the holding member 160. The hole of the holding member 160 which is traversed by the connection part is then arranged in the central portion 161 that joins the two half-ring shaped portions 162, 163.

The connection assembly 140 comprises a bushing 145 extending in the outer portion of the connection assembly. The bushing 145 has at its center a passage in which the connection part 150 extends. Preferably, the bushing 145 has a circular section. The bushing 145 forms an abutment in the radially inner direction for the connection part 150. For this purpose, the connection part 150 has at its radially outer end a head 151 defined by an enlarged section, and the bushing 145 has a shoulder 146 forming an abutment in the radially inner direction for the head 151 of the connection part.

More specifically, the bushing 145 includes a first portion having a wide section authorizing the passage of the connection part 150, including its head 151, and preferably also authorizing the passage of a tool for setting up the connection part 150, such as for example a wrench engaged with the head 151. This first portion is extended radially inwardly by a second portion having a narrow section, authorizing the passage of one end of the connection part 150 but prohibiting the passage of the head 151, the transition between the first portion and the second portion of the bushing 145 forming the shoulder 146. Preferably, and as illustrated, the second portion of the bushing 145 passes through the opening 108, thus protecting the connection part 150. The second portion of the bushing 145 can then come into contact with the holding part 160 on its radially external face.

When setting up the connection assembly 140, it is therefore sufficient to introduce the connection part 150 in the bushing until the head 151 is abutting against the shoulder 146. In the case where the connection part is a bolt, this abutment can thus mark the limit of screwing by naturally limiting it. It is therefore a very simple mounting requiring no adjustment. It is also possible to apply a predetermined tightening torque, for example the same for all the parts, that is not an adjustment torque. Alternatively, it would be possible to provide that the bushing 145 and the connection part 150 form a single part. Preferably, however, the bushing 145 and the connection part 150 are separate.

The connection assembly 140 comprises in its outer portion 141 a resilient return member urged in compression towards the fixing frame 104 by the connection part 150. The resilient return member preferably takes the form of a spring 170, as represented in FIGS. 3 and 4. The spring 170 is preferably disposed around the bushing 145. The bushing 145 forms an abutment in the radially outer direction for the spring 170. To do so, the bushing has a flange 147 protruding in a direction opposite to the center of the bushing 145 through which the connection part 150 passes, and the spring 170 is disposed between this flange 147 and the fixing frame 104. Preferably, as can be seen in FIG. 4, this flange 147 extends from the outer end of the bushing 145.

It is through the bushing 145 that the spring 170 is compressed towards the fixing frame 104 by the connection part 150. The action of the spring 170 ensures that a pressure allowing the pressing of the connection assembly 140 on this fixing frame 104 is exerted on the fixing frame 104, while authorizing a displacement between the connection assembly 140 and this fixing frame 104. The pressing, constant even during the displacement, allows maintaining a clearance J between a cooling tube 120 and the casing 10, which can therefore be conceived minimal.

This displacement of the connection assembly 140 is further made possible by the fact that the opening 108 in the fixing frame 104 has a section greater than the section of the portion of the connection assembly 140 passing through this opening 108, so that the connection assembly 140 is movable relative to the fixing frame 104, thereby allowing the free circumferential and/or radial expansion of the cooling tubes 120 with respect to the fixing frame 104. Preferably, the opening 108 has an oblong or oval shaped section that is to say with a larger dimension in one direction than in other directions. For example, the opening of the fixing frame 104 has in the circumferential direction of the turbomachine a dimension at least 1.5 times greater than its dimension in a direction (e.g. typically in the axial direction) perpendicular to the circumferential direction of the turbomachine.

This opening 108 thus authorizes displacements of the bushing 145 which passes therethrough in a plane orthogonal to the axis of the opening 108 and therefore also displacements of the holding member 160 which is made secured to the bushing 145 by the connection part 150. These displacements authorize the differential expansions of the cooling tubes 120 relative to the casing 10 during operation.

The holding device may comprise an outer bearing member 155 in the outer portion of the connection assembly 140, disposed against the outer face of the fixing frame 104, on which the spring 170 bears. The outer bearing member 155 is for example a metal washer. The outer bearing member 155 is not secured to the bushing 145. The outer bearing member is not fixed to the fixing frame 104, and therefore authorizes, through its sliding on the surface of the fixing frame 104, the displacement of the connection assembly 140 relative to the fixing frame 104.

An inner bearing member 156 may be present in the inner portion 142 of the connection assembly, disposed against the inner face of the fixing frame 104 and separating the holding member 160 and said inner face of the fixing frame 104. The inner bearing member 156 comprises an orifice facing the opening 108 of the fixing frame 104. The inner bearing member 156 may be for example a metal washer. Just like the outer bearing member 155, the inner bearing member 156 is not fixed to the fixing frame 104, and therefore authorizes, through its sliding on the inner surface of the fixing frame 104, the displacement of the connection assembly 140 relative to the fixing frame 104. The inner bearing member 156 allows preventing wear of the holding member 160 against the inner surface of the fixing frame 104. It also ensures a spacing by a determined distance between the holding member 160 and the fixing frame 104, avoiding providing of a margin of tolerance for the clearance J between the cooling tubes 120 and the external face 11 of the casing 10.

The outer bearing member 155 and the inner bearing member 156 may be used as possible adjustment variables (by their respective thicknesses or by their mere presence or absence) to obtain the desired clearance J. They can thus be used to rectify the shapes of other members of the cooling system 100 that would affect the clearance J. For example, the thickness of the outer bearing member 155 and/or of the inner bearing member 156 can be adapted to possible variations in the distance between the fixing frame 104 and the external face 11 of the casing 10, in order to compensate them. These members can also be used as adjustment shim upon mounting if necessary.

When setting up the cooling system 100, the members for holding 160 the cooling tubes 120 are fixed to the cooling tubes 120, for example by brazing. Advantageously, various members may be preassembled on the fixing frame 104 before mounting it on the casing 10. It is for example possible to dispose therein the outer bearing members 155 with the orifices in front of the opening 108, then to set up the springs 170 on these outer bearing members 155. The bushings 145 are then introduced into the openings 108 so that the springs are compressed by the flanges 147 of the bushings 145. The connection parts 150 are then set up in the bushings 145, and engage the tightening member 142 of the inner portion of the connection assembly 140. The tightening of the connection parts 150 makes the bushing 145 secured to the holding member 160. More specifically, in the typical case where the connection part 150 is a bolt, it is sufficient to screw the bolt until it is blocked. Upon the tightening of a connection part 150, the head 151 abuts against the shoulder 146 of the bushing 145. The bushing 145 is then driven in the radially inner direction, through the opening 108, until abutting against the holding member 160. It is then no longer possible to tighten the connection part 150. The cooling system 100 constituted by the holding device 101 and the cooling tubes 120 can then be set up on the casing 10, for example by using the fixing means such as holes 107 present at the ends 106 of the fixing frame 104.

The outer portion 141 and the inner portion 142 of the connection assembly 140 are then secured by the connection part 150, and hold the holding member 160 with respect to the fixing frame 104, and therefore the clearance J between a cooling tube 120 and the external face 11 of the casing 10, while allowing a relative displacement between:
  on the one hand the connection assembly 140, the holding member 160, and the cooling tube 120, and
  on the other hand the fixing frame 104 and the casing 10.

The setting up of the holding device 101 therefore does not require any particular adjustment to ensure a suitable clearance J (in the radial direction of the turbine) between a cooling tube 120 and the external face 11 of the casing 10. The clearance J is determined by the dimensions of the constituent members of the holding device 101. The mounting of the holding device 101 is therefore greatly simplified. It suffices for example to bolt the connection part 150 until it is blocked.

In addition, it is then possible to provide a minimal clearance J, since the latter is guaranteed by the holding device 101, and since it is therefore no longer necessary to provide a margin of tolerance. Optionally, by choosing the characteristics (in particular the thickness) of the bearing members 155, 156 to use them as shim (to manage the deviations for example), it is possible to further reduce the tolerances on the clearance J.

In addition, since the member for holding 160 a cooling tube 120 leaves free the portion of the cooling tube 120 facing the casing 10, the cooling of the casing 10 is improved, especially as it is possible to thus bring the cooling tube closer to the casing 120. The absence of the holding member 160 between the cooling tube 120 and the casing 10 also means that one less thickness is to be taken into account for the dimensioning of the cooling system 100, facilitating this dimensioning and making it more accurate, again making it possible to provide a minimal clearance J.

The invention is not limited to the embodiment described and represented in the appended figures. Modifications remain possible, in particular from the point of view of the constitution of the various members or by substitution of technical equivalents, without departing from the protection scope of the invention.

The invention claimed is:

1. A holding device for holding at least one cooling tube of a turbomachine casing cooling system, the holding device extending along an axis defining an axial direction around which the casing extends, and the holding device including a fixing frame adapted to be secured to the casing by being disposed in a radially outer manner with respect to the casing, a holding member configured to hold the cooling tube, and a connection assembly which connects the holding member and the fixing frame, wherein the connection assembly extends on either side of the fixing frame, defining with respect to the fixing frame an outer portion of the connection assembly radially external to the fixing frame and an inner portion of the connection assembly radially internal to the fixing frame, on the casing side, the connection assembly comprising a connection part extending through an opening of the fixing frame from the outer portion to the inner portion, the inner portion radially internal to the fixing frame being secured to the holding member while the outer portion comprises a resilient return member urged in compression towards the fixing frame by the connection part, wherein the holding member is configured to hold two axially adjacent cooling tubes, and the inner portion of the connection assembly is configured to be disposed between two axially adjacent cooling tubes.

2. The holding device according to claim 1, wherein the opening of the fixing frame has a section greater than the section of the portion of the connection assembly passing through this opening, so as to authorize a displacement between the connection assembly and the frame, the opening of the fixing frame having an oblong shape, the opening of the fixing frame having in a circumferential direction a dimension at least 1.5 times greater than a dimension in the axial direction.

3. The holding device according to claim 1, comprising a bushing extending in the outer portion of the connection assembly, the bushing forming an abutment in a radially inner direction for the connection part, and forming an abutment in a radially outer direction for the resilient return member, wherein the connection part has at an radially outer end a head defined by an enlarged section, and the bushing has a shoulder forming an abutment in the radially inner direction for the head of the connection part, and wherein the bushing has a flange and the resilient return member is disposed between this flange and the fixing frame.

4. The holding device according to claim 1, wherein the connection part is a bolt comprising a threaded body, and the inner portion comprises a threaded accommodation member disposed on a side radially internal to the holding member, and wherein the threaded body of the bolt is screwed.

5. The holding device according to claim 1, comprising an outer bearing member in the outer portion of the connection assembly, disposed against the outer face of the fixing frame, on which bears the resilient return member.

6. The holding device according to claim 1, comprising an inner bearing member in the inner portion of the connection assembly, disposed against the inner face of the fixing frame and separating the holding member and said inner face of the fixing frame.

7. The holding device according to claim 1, wherein the holding member is partially covering the periphery of the cooling tubes and extends around part of the circumference of a cooling tube in a half-ring shape.

8. The holding device according to claim 1, wherein the holding member extends around part of the circumference of a cooling tube and leaves free another part of the circumference of the cooling tube intended to face the casing.

9. The holding device according to claim 1, wherein the holding member has a generally flat central portion and two half-ring shaped portions intended to conform to and cover, at least partially, the annular shape of the two adjacent cooling tubes.

10. The holding device according to claim 9, wherein a hole of the holding member traversed by the connection part is arranged in the central portion that joins the two half-ring shaped portions.

11. A turbomachine casing cooling system, including:
a plurality of cooling tubes,
the holding device according to claim 1, the holding member holding two axially adjacent cooling tubes.

12. A turbomachine for an aircraft comprising a casing extending around an axial direction of the turbomachine, and a cooling system according to claim 11, the fixing frame being secured to the casing in a radially outer manner with respect to the casing, the plurality of cooling tubes being disposed in a radially outer manner with respect to the casing between the casing and the fixing frame.

* * * * *